R. B. BENJAMIN.
LAMP SOCKET CASING.
APPLICATION FILED APR. 19, 1912.
1,247,492.
Patented Nov. 20, 1917.
3 SHEETS—SHEET 1.
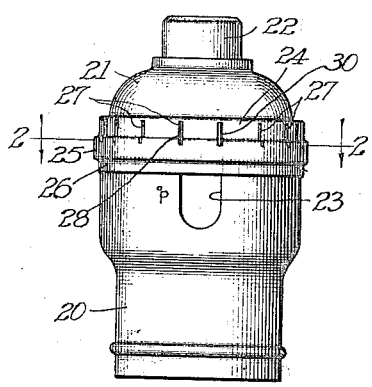
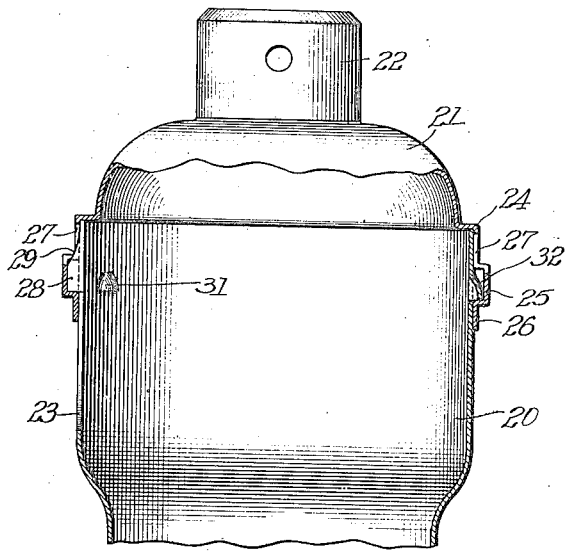
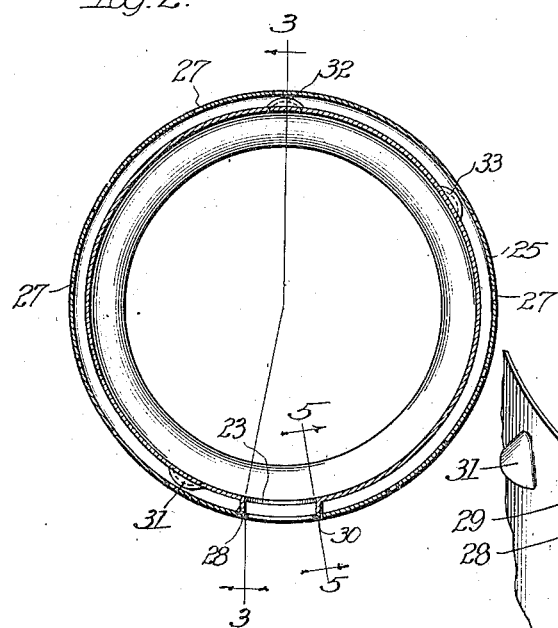
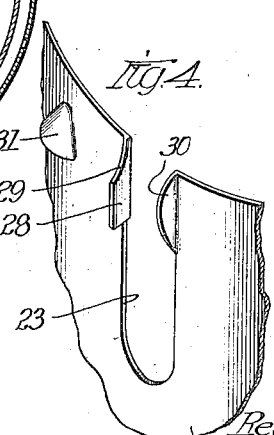
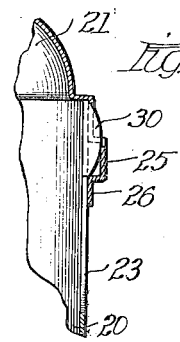
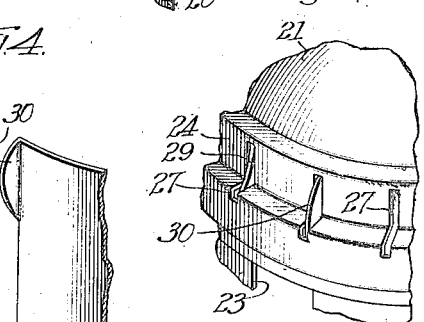
Inventor
Reuben B. Benjamin

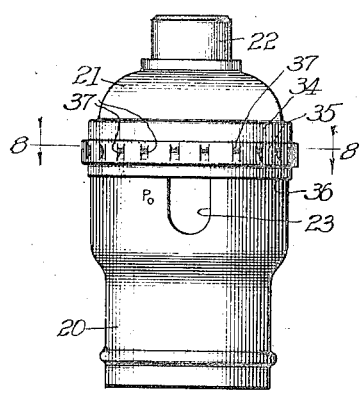
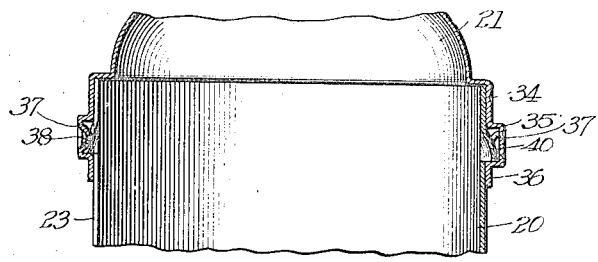
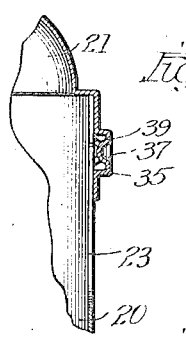
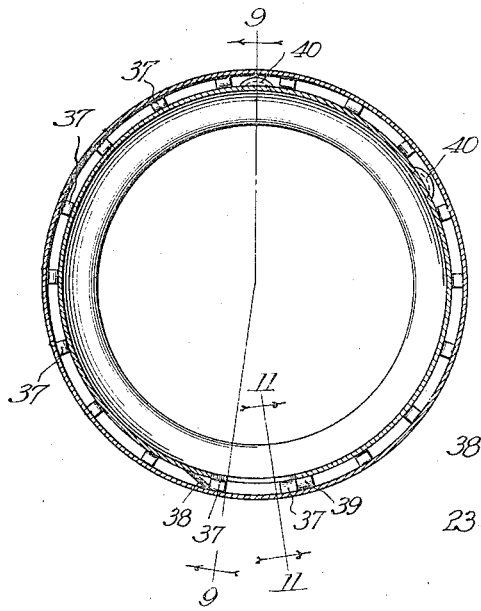
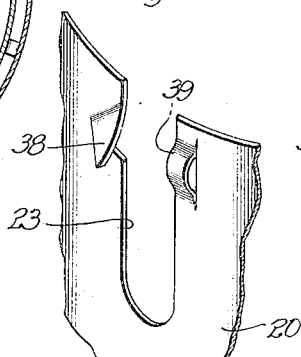
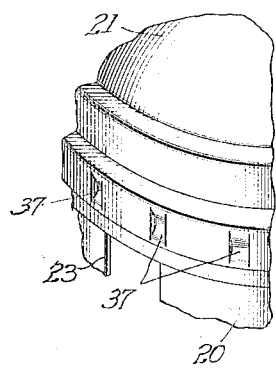

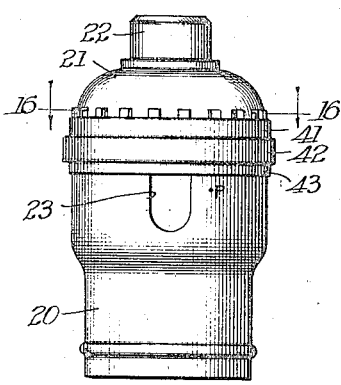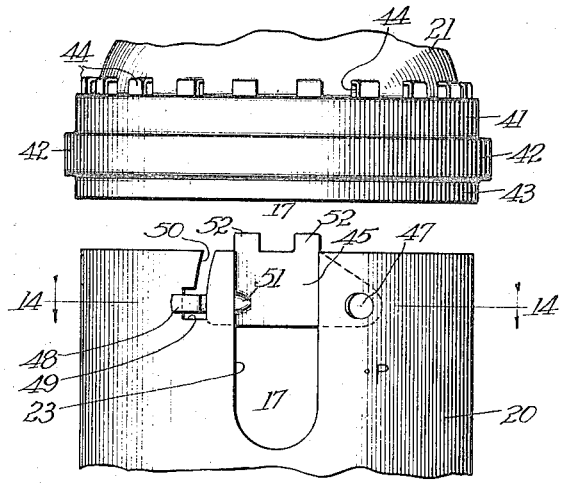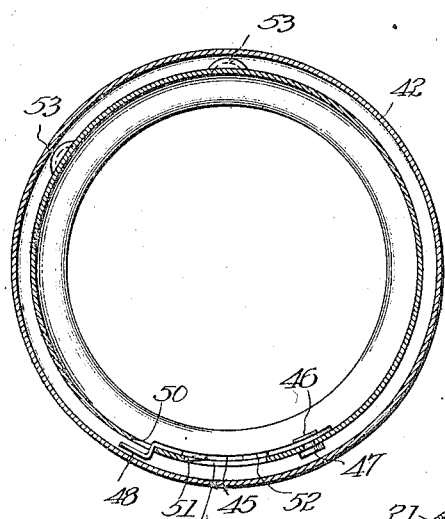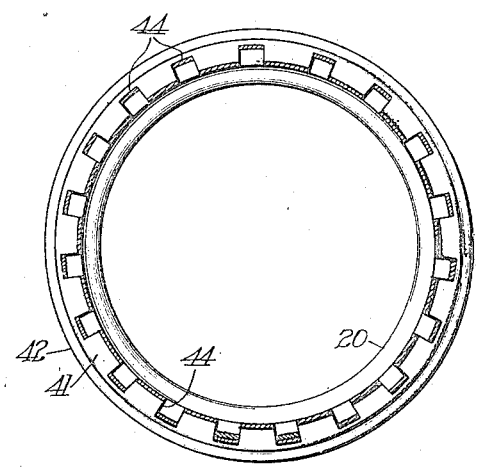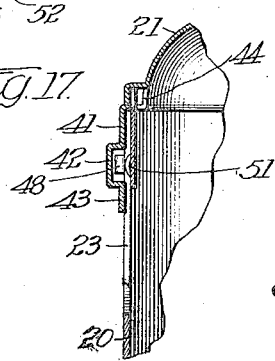

UNITED STATES PATENT OFFICE.

REUBEN B. BENJAMIN, OF CHICAGO, ILLINOIS, ASSIGNOR TO BENJAMIN ELECTRIC MFG. COMPANY, OF CHICAGO, ILLINOIS, A CORPORATION OF ILLINOIS.

LAMP-SOCKET CASING.

1,247,492.　　　　　　Specification of Letters Patent.　　Patented Nov. 20, 1917.

Application filed April 19, 1912.　Serial No. 691,969.

*To all whom it may concern:*

Be it known that I, REUBEN B. BENJAMIN, a citizen of the United States, residing at Chicago, in the county of Cook and State of Illinois, have invented new and useful Improvements in Lamp-Socket Casings, of which the following is a full, clear, concise, and exact description, reference being had to the accompanying drawing, forming a part of this specification.

My invention pertains to lamp socket casings, and has a special reference to the means for securing the cap and the shell together. As is well known, electric lamp socket casings ordinarily consist of a shell which incloses the contact-supporting base, etc., and a cap which fits over the upper end of the shell, and is adapted to be secured to a conduit, or the like. It is an object of my invention to provide a socket casing in which the cap and the shell may be readily connected and disconnected, but in which the shell, when connected with the cap, is locked thereto securely, and so as not to be liable to accidental detachment. It is a further object of my invention to provide a casing for switch lamp sockets, in which the shell may be secured to the cap in any one of a plurality of positions, depending upon in what direction it is desired that the switch key or the like shall extend. And it is a still further object of my invention to provide a lamp socket casing having the above qualities, which will be of a simple construction and capable of being produced at a reasonable cost.

Three constructions of socket casing, embodying my invention, are described, by way of example, in the following specification, and shown in the accompanying drawings, in which:

Figure 1 is a side elevation of one form of socket casing constructed in accordance with my invention;

Fig. 2 is an enlarged sectional plan, the section being taken on the line 2—2 of Fig. 1;

Fig. 3 is a vertical section taken on the line 3—3 of Fig. 2 looking in the direction of the arrows;

Fig. 4 is a perspective view of a portion of the shell adjacent the key slot, showing the retaining lugs;

Fig. 5 is a detail sectional view, the section being taken on the line 5—5 of Fig. 2 looking in the direction of the arrows;

Fig. 6 is a perspective view of a portion of the shell and cap, showing the retaining lugs in position in the slots of the cap;

Fig. 7 is an elevation of another form of casing constructed in accordance with my invention;

Fig. 8 is a sectional plan, upon an enlarged scale, the section being taken on the line 8—8 of Fig. 7;

Fig. 9 is a partial section taken on the line 9—9 of Fig. 8 looking in the direction of the arrows;

Fig. 10 is a perspective view of a portion of the shell adjacent the key slot, showing the retaining projections;

Fig. 11 is a detail sectional view, the section being taken on the line 11—11 of Fig. 8;

Fig. 12 is a perspective view of a portion of the shell and cap, showing the cap attached to the shell;

Fig. 13 is a side elevation of still another form of casing constructed in accordance with my invention;

Fig. 14 is a sectional plan of the same, upon an enlarged scale, the section being taken on the line 14—14 of Fig. 15;

Fig. 15 is a fragmentary elevation, upon an enlarged scale, of the casing, showing the cap detached from the shell;

Fig. 16 is a sectional plan of the casing, the section being taken on the line 16—16 of Fig. 13; and Fig. 17 is a fragmentary vertical axial section, showing the locking connection between the cap and shell of the modification of Fig. 13.

Like characters of reference refer to like parts throughout the following specification and in the several figures of the accompanying drawings. Each of the casings shown in the drawings consists of a shell 20 which is adapted to receive the ordinary insulating base, for carrying the contacts, binding terminals, etc., of the socket, and which has a key slot 23 therein; and a cap 21 which is detachably secured to the shell so as to close the upper end thereof and protect the binding terminals, the cap 21 being provided with a bushing 22, by means of which it may be secured to a conduit or the like.

Referring now particularly to the construction of casing shown in Figs. 1-6, the cap 21 is expanded at its lower end to form an enlarged collar 24, which fits closely about the upper end of the shell 20, when the shell is inserted into the cap. The collar 24 is formed with an outwardly extending hollow bead 25, which extends completely around the collar, which latter is extended downward beyond the bead 25, to form a skirt 26. Formed in the collar 24, and in the upper portion of the bead 25, are a plurality of vertical slots 27. These slots are equidistantly disposed around the collar 24 and bead 25, and are spaced apart a distance which is substantially the width of the key slot 23 of the shell 20. With the slots 27 coöperate a pair of lugs carried by the shell 20, as will now be described.

The metal of the shell 20 is bent outward, at one side of the key slot 23, to form a lug 28 (Fig. 4), the upper part of which is beveled, as at 29, and the lower part of which is cut off square. The length of the lug 28 is such that, when the shell is inserted into the cap, so that the lug enters one of the slots 27, the lower end of the lug will engage against the shoulder formed by the lower part of the bead 25. The metal of the shell 20 is bent out at the opposite side of the key slot 23, so as to form a curved lug 30, which, also, is adapted to enter one of the slots 27 of the cap, when the shell is inserted into the cap. The metal of the shell 20 is punched out, to one side of the lug 28, so as to form an upwardly beveled projection 31, the lower end of which forms a shoulder adapted to engage the lower part of the bead 25, when the shell is inserted into the cap. Two other projections 32 and 33, similar to the projection 31, are provided at the side of the shell opposite to the projection 31.

In order to connect the shell with the cap, it is only necessary to press the shell thereinto, the projection 31 and lugs 28 and 30 springing past the skirt 26 into the bead 25. The connection of the shell with the cap can easily be made in such manner that the lugs 28 and 30 will enter directly into a pair of slots 27, immediately the shell is thrust into the cap. If the shell should not have been inserted into the cap, however, with the lugs 28 and 30 in proper alinement with a pair of the slots 27, the lugs can readily be made to enter the slots, by effecting a slight twisting movement of the shell relatively to the cap. When the shell is connected to the cap, with the lugs 28 and 30 located in a pair of the slots 27, it will be seen that the metal of the shell cannot be pressed inward at any place other than immediately at one side or the other of the key slot 23, since an inward movement of any other portion of the shell would necessarily have to be accompanied by a movement of the sides of the key slot toward each other, and such movement is definitely prevented by reason of the engagement of the lugs 28 and 30 in the slots 27. The effect of the construction is, therefore, to prevent detachment of the shell from the cap, unless the pressure be applied to the shell at the proper part thereof. When it is desired to detach the shell from the cap, pressure is applied to the shell, at the part thereof immediately below the skirt 26, and adjacent the lug 28. This point is indicated at P (Fig. 1). The effect of applying pressure at the point P is to bend inward the metal of the shell at this point, and thereby to cause the projection 31 and the lug 28 to move inward out of engagement with the bead 25. When this has been done, the shell may be removed from the cap by a kind of tilting movement about the projections 32 and 33 as pivots, the curved lower surface of the projection 30 enabling it to pass out of the bead 25. The shell may, thus, be attached to, or detached from, the cap with great facility; but accidental detachment of the cap from the shell is practically impossible, owing to the fact that, to effect such detachment, pressure must be applied to the shell at one particular point. The shell, when attached to the cap, is locked by reason of the engagement of the lugs 28 and 30 in the slots 27, against angular movement with respect to the cap. Furthermore, the shell may be attached to the cap in as many different positions as there are slots 27 in the cap, thus permitting the key, or the like, extending out through the slot 23, to be made to face in any direction desired. A casing constructed as described above is simple and durable, and may be placed upon the market at a reasonable price.

Referring now to the construction shown in Figs. 7-12, the cap 21 is expanded, as before, at its lower end, so as to form an enlarged collar 34, adapted to fit over the upper end of the shell 20 when the latter is inserted into the cap. The collar 34 is formed with an outwardly extending hollow bead 35 and is extended downward, below such bead, so as to form a skirt 36. The metal of the cap is forced inward, at the periphery of the bead 35, so as to form a plurality of inwardly extending projections 37. These projections are evenly disposed around the bead 35 and are spaced apart so that the distance between the outer edges of each pair of them is substantially equal to the width of the key slot 23 of the shell. A pair of the projections 37 is adapted to engage between corresponding projections carried by the shell, adjacent the key slot thereof, thus to prevent movement of the edges of the key slot toward each other, as will now be described.

The metal of the shell 20 is cut and punched out, at one side of the key slot 23, to form an upwardly beveled tooth 38 (Fig. 10), the lower portion of which forms a cut-metal shoulder, which is adapted to engage the shoulder formed by the lower part of the bead 35 when the shell is connected with the cap. The metal of the shell is pressed out, at the side of the key slot 23 opposite to the tooth 38, to form a curved lug 39, adapted to enter the bead 35, when the shell is secured to the cap so as to inclose a pair of the projections 37 between its side and the opposing side of the tooth 38 (Fig. 8.) The shell is formed, at the side thereof, opposite to the tooth 38, with a pair of upwardly beveled projections 40, formed so as to present, at their lower parts, cut-metal shoulders, adapted to engage the shoulder formed by the lower part of the bead 35 (Fig. 9).

The shell may be attached to the cap by simply pushing it thereinto, the metal of the shell adjacent the key slot springing inward to permit the tooth 38 and lug 39 to spring past the skirt 36 of the cap into the bead 35. The shell may readily be inserted into the cap, so that the tooth 38 and lug 39 will directly engage a pair of the projections 37, one on each side thereof (Fig. 8); or in case the shell should not be inserted into the cap with the tooth 38 and lug 39 in proper alinement with a pair of the projections 37, the tooth 38 and lug 39 can be made to engage properly a pair of the projections 37, by slightly twisting the shell relatively to the cap. When it is desired to remove the shell from the cap, this may be effected by exercising an inward pressure upon the shell, immediately below the skirt 36 and adjacent the tooth 38. The point at which pressure should be aplied is indicated at P (Fig. 7). The effect of exercising pressure upon the point P is to cause the tooth 38 to move inward out of engagement with the bead 35; and the shell may then be removed from the cap by a kind of tilting action about the projections 40, as pivots, the curved lower portion of the lug 39 permitting it to pass out of the bead 35. The metal of the shell cannot be pressed inward at any point other than one side or the other of the key slot 23, for the reason that inward movement of the shell, at any other place, would have to be accompanied by a movement of the edges of the key slot 23 toward each other, and this is prevented by reason of the engagement of the tooth 38 and lug 39 with the outer sides of a pair of the projections 37. It will be seen that the shell may be attached to the cap, and removed therefrom with great facility, and that it is almost impossible for the shell to become accidentally detached from the cap, since such detachment needs the application of pressure at one particular point. The shell can be connected with the cap in as many different positions as the cap has projections 37, thus enabling the key or the lock extending outward through the slot 23 to be made to extend in any direction desired. Furthermore, the shell, when secured to the cap, is definitely locked in its angular position with respect thereto. The socket shown in Figs. 7–12 is of a simple and durable construction and may be placed upon the market at a low price.

Referring now to the construction shown in Figs. 13–17, the cap is expanded, as before, at its upper part, to form an enlarged collar 41, adapted to fit over the upper portion of the shell 20 when the shell is secured to the cap. The collar 40 is formed with an upwardly extending bead 42, and extends downward, below such bead, so as to form a skirt 43. The metal of the cap 21 is pressed out immediately above the collar 41, so as to form a plurality of pockets 44. These pockets are disposed equidistantly around the cap 21, and are spaced apart so that the distance between the outer sides of each pair of pockets is substantially equal to the width of the key slot 23 of the casing 20. The pockets 44 are adapted to coöperate with projections of the shell, so as definitely to lock the shell in its angular position with respect to the cap, as will now be described. Pivoted to the shell, at the left-hand side of the key slot 23 is a locking plate 45, the pivotal connection being effected by means of a rivet 46, the outer end 47 of which is enlarged so as to form a head capable of engaging within the bead 42 of the cap when the shell is connected with the cap. The end of the locking plate 45 opposite to the rivet 46 is bent so as to form a tongue 48, which extends through a suitable aperture 49 formed in the shell, which aperture communicates with a curved slot 50 extending to the edge of the shell. By manipulating the tongue 48, the locking plate 45 may be made to swing upward about its pivot 46, thus to free the upper end of the key slot 23, and enable the key shank to be inserted thereinto, or removed therefrom, when it is desired to place a socket into, or withdraw it from, the shell. The locking plate 45 is punched outward to form a projection 51, which engages the side of the key slot 23 opposite to the pivot 46, and thus prevents the sides of the key slot from moving toward each other. The locking plate 45 is further provided, at its upper part, with upwardly extending lugs 52 of a size corresponding to that of the pockets 44, and spaced apart so that the lugs 52 can enter a pair of the pockets 44 when the shell is connected with the cap. The shell is provided, at the part thereof opposite the rivet 46, with a pair of upwardly beveled projections 53 having cut-metal shoulders at their lower portions adapted to engage the shoulder formed by the lower part of the bead 42.

When it is desired to connect the shell with the cap, pressure is applied to the shell, somewhat below the head 47, at the point P (Figs. 13 and 15), thus causing the metal of the shell to spring inward. The shell is thus pushed up into the cap, with the projections 52 engaging in a pair of the pockets 44. When the pressure is removed from the shell, the head 47 will spring into engagement with the bead 42, and will, together with the projections 53, prevent withdrawal of the shell from the cap. The shell being thus secured to the cap, it cannot be accidentally detached therefrom, since such detachment requires the application of pressure at the point P. The application of pressure at any other part of the shell, for instance, adjacent the projections 53, would not result in the metal of the shell being moved inward, since the projection 51 of the locking plate 45 prevents the edges of the key slot from being moved toward each other. When it is desired, however, to remove the shell from the cap, this may be readily effected by exerting pressure at the point P, whereupon the head 47 is freed from the bead 42, and the shell consequently can be removed from the cap. It will be understood that the inward movement of the head 47, resulting from the application of pressure at the point P, will also result in the inward movement of the tongue 48, whereby the tongue is also freed from the bead 42. The shell may be attached to the cap in as many positions as there are pockets in the cap 21; and the projections 52, by reason of their engagement in the pockets 44, securely lock the shell in its angular position with respect to the cap.

While I have described, and shown in the accompanying drawings, three forms in which my invention may be embodied, I wish it to be understood that the invention may be embodied in still other forms, without exceeding the scope thereof, as defined in the appended claims.

Having thus described my invention, what I claim as new and desire to secure by Letters Patent, is:

1. A socket casing comprising a cylindrical shell, and a cap having a flange portion surrounding the upper end of said shell, said cylindrical shell having a longitudinally extending slot open at the upper edge of the shell, said shell having a pair of outwardly extending abutments one on each side of said slot adjacent the upper part thereof, said cap having a plurality of pairs of abutments for selective engagement with the pair of abutments on said shell, the engagement between said pairs being such as to prevent movement of the edges of said slot toward each other, and snap inter-engaging means on said cap and shell engageable and disengageable by expansion and contraction of said shell.

2. A socket casing comprising a cylindrical shell and a cap having a flange portion surrounding the upper end of said shell, said cylindrical shell having a longitudinally extending slot open at the upper edge of the shell, said shell having a pair of abutments one on each side of said slot adjacent the upper part thereof, said cap having a plurality of pairs of abutments for selective engagement with the pair of abutments on said shell, the engagement between said pairs being such as to prevent movement of the edges of said slot toward each other, and snap inter-engaging means on said cap and shell engageable and disengageable by expansion and contraction of said shell.

3. A socket casing comprising a cylindrical shell and a cap having a flange portion surrounding the upper end of said shell, said cylindrical shell having a longitudinally extending slot open at the upper edge of the shell, said shell having a pair of outwardly extending abutments one on each side of said slot adjacent the upper part thereof, said cap having a plurality of pairs of abutments for selective engagement with the pair of abutments on said shell, the engagement between said pairs being such as to prevent movement of the edges of said slot toward each other, and snap inter-engaging means on said cap and shell engageable and disengageable by expansion and contraction of said shell, said first pair of abutments being in the form of vertical wings extending outwardly from the edges of said slot.

4. A socket casing comprising a cylindrical shell, and a cap having a flange portion surrounding the upper end of said shell, said cylindrical shell having a longitudinally extending slot open at the upper edge of the shell, snap inter-engaging means on said cap and shell engageable and disengageable by expansion and contraction of the upper part of said shell, and a plurality of selectively inter-engageable means on said cap and shell for preventing movement of the edges of said slot toward each other, said selectively inter-engageable means comprising a pair of wings, one extending outwardly from each edge of said slot, said cap having a plurality of pairs of recesses to selectively receive said wings.

In witness whereof, I have hereunto subscribed my name in the presence of two witnesses.

REUBEN B. BENJAMIN.

Witnesses:
 CHARLES G. COPE,
 MABEL REYNOLDS.